TRANSLATOR FOR AUTOMATIC TELEPHONE EXCHANGES
Filed Aug. 12, 1966
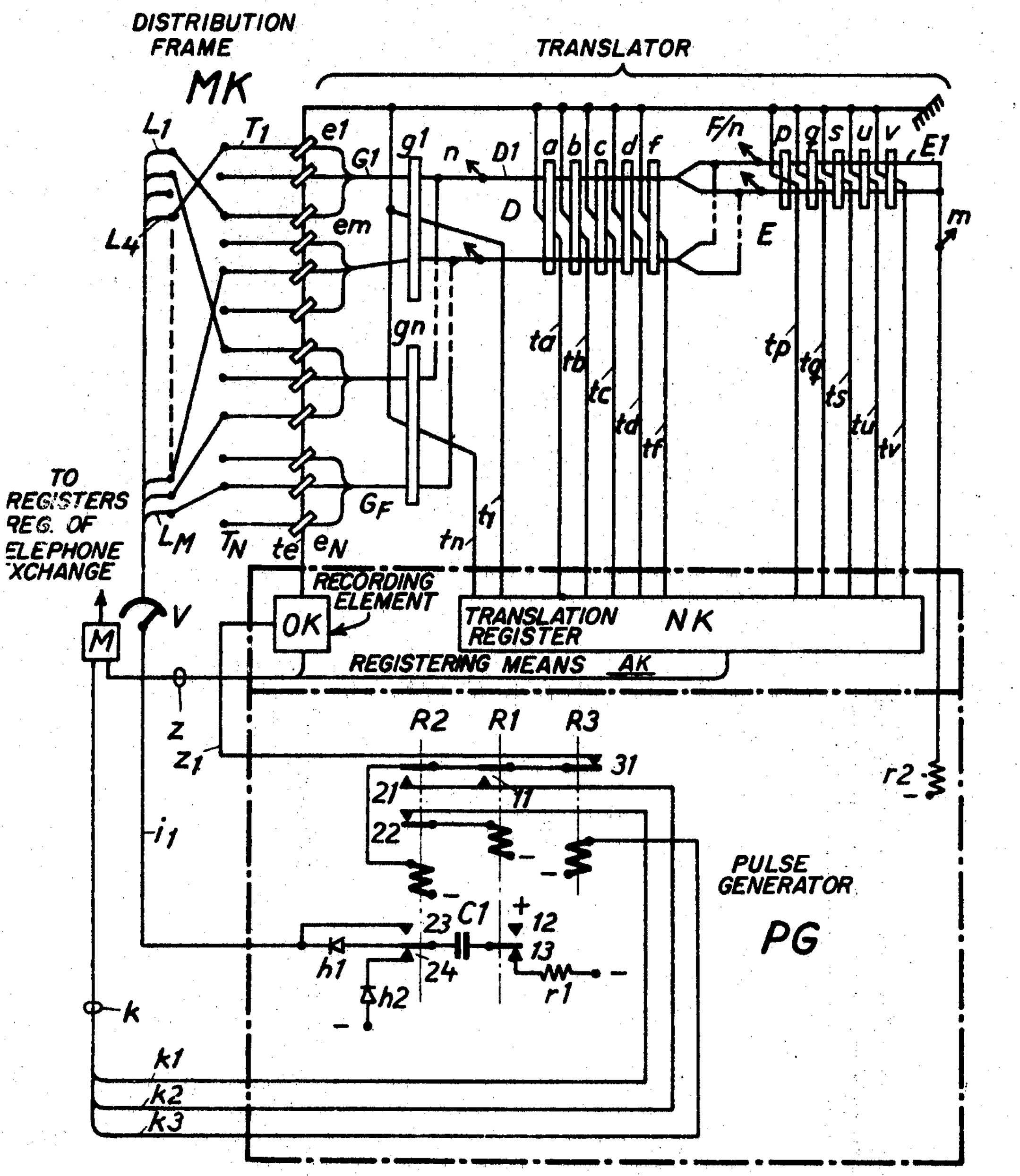
INVENTORS
Per-Olof Olsson
Knut Per Johansen
BY Hane and Nydick
Attorneys United States Patent Office 3,524,024

Patented Aug. 11, 1970

3,524,024
TRANSLATOR FOR AUTOMATIC TELEPHONE EXCHANGES

Per-Olof Olsson, Hagersten, and Knut Johansen, Huddinge, Sweden, assignors to Telefonaktiebolaget LM Ericsson, Stockholm, Sweden, a corporation of Sweden Filed Aug. 12, 1966, Ser. No. 572,055
Claims priority, application Sweden, Sept. 1, 1965 11,389/65
Int. Cl. H04q 3/47
U.S. Cl. 179—18 2 Claims

ABSTRACT OF THE DISCLOSURE

In a telephone exchange there is a number translator comprising a control device which receives a line equipment number from a register and causes a line selector to transmit a pulse to an indicated point on one side of a distribution frame. The pulse is transmitted via a jumper wire to another point on the frame to which is connected a test winding which pulses a coded combination of magnetic cores in a translator. In response thereto the translator transmits back to the register the line location number.

The present invention refers to automatic telephone exchanges and more particular to a translator for translation between two number systems or grouping systems. In telephone exchanges such translators are used to determine, by means of a subscriber's number recorded in a register, an outgoing traffic route or a called line position in a switch multiple or to determine, with a knowledge of the multiple position of a line, the directory numbers of the line, and other data.

Each telephone exchange includes at least one number group comprising a plurality of directory numbers concerning subscribers connected to the telephone exchange. Number groups must contain a larger group of numbers than the number of subscribers corresponding to the group. A new subscriber may be provided with an arbitrary multiple position but must obtain a directory number that does not belong to another subscriber but is included in the telephone directory. Furthermore it ought to be possible to provide a subscriber line with an arbitrarily chosen directory number. Vacant directory numbers must always be found.

According to the invention each of the lines in service is provided with a signal wire in a group of signal wires and with a test wire in a group of test wires. The signal wires and test wires are arranged according to different grouping or numbering systems which are independent of each other. The connection between the data of a line in one system and the data of the line in the other system is determined by the test wire of the line passed through magnetic annular cores in an analyzer and is connected to the signal wire of the line in an intermediate distribution frame containing connecting points for all signal wires and test wires.

An object of the invention is to determine with simple means and to record in the recording device of a translator the data, for example the line location number, of the lines within a telephone exchange by sending pulses from a pulse generator through the signal wire and test wire in one line at a time. If the number corresponds to the signal wire the location can be determined and if the location is given by the signal wire, the line location number can be determined by means of the translator.

This object is achieved by means of a first group of magnetic annular cores for the selection of one main group among a number of main groups of lines in the grouping system corresponding to the test wires and a second group of magnetic annular cores for the selection of a subgroup within one of the main groups. Each test wire is passed through at least one annular core in the first group and is interconnected with a corresponding test wire from each of all other main groups. Common test wires issuing from the interconnecting points are brought together to subgroups, each having one or more test wires passed through at least one annular core in the second group of annular cores.

In known translators, groups of annular cores are provided for, for example, each hundred, ten and unit and all test wires belonging to the same hundred are passed through the same hundreds ring, all with the same ten through a common tens ring and all with the same unit through the same units ring. This procedure is unnecessarily expensive and is difficult to execute.

The invention will be described in greater detail below by means of the accompanying drawing.

In the sole figure there is shown a number group comprising annular cores *g1–gn* for main group marking, a group D with annular cores for subgroup marking and a group E with annular cores for units marking. An intermediate distribution frame MK contains connecting points for M signal wires L1–LM and for N test wires T1–TN. The test wires T1–TN are combined in *n* main groups and in F subgroups G1–GF having each *m* test wires. The test wires of a number of *F/n* subgroups form a main group and are passed through an annular core *g1–gn* for main group marking. The subgroups within each main group are numbered and those test wires of different main groups which belong to subgroups with the same number are interconnected and connected to test wires which are passed through annular cores in the group D and form *F/n* groups. The annular cores D form *F/n* combinations and each combination corresponds to a subgroup. The test wires of each subgroup are numbered and those test wires of different subgroups in D, which have the same number or unit are interconnected and connected to a test wire that is passed through annular cores in the group E where *m* units are separated by combinations of the annular cores in E.

For reading of the numbering of the test wires, reading wires *t1–tn* are provided for the main groups, *ta–tf* for the subgroup and *tp–tv* for the unit. Furthermore there is provided a row with annular cores *e1–en* that are individual for the test wires and a reading wire *te* that is common for these annular cores. The reading wires are connected to recording elements in registering means AK. The recording element OK of the wire *te* is separated from the recording elements which form a translation register NK. All indicators are well known devices, e.g. each composed of an amplifier and an electronic bistable circuit.

In the figure there is also shown a pulse generator PG comprising relays R1–R3, a capacitor C1, rectifiers H1–H2 and resistors R1–R2. The pulse generator PG is connected by means of a selector device V, e.g. a contact pyramid, to the signal wires L1–LM. The selector device V is controlled by a control means M, such as one or more markers that is set according to a directory number or a multiple position by, for example, a register, or a marker in a group REG of registers or markers belonging to the telephone exchange and connected one at a time to the translator.

The annular cores in the group D are indicated by reference characters *a–f* and the annular cores in the group E are indicated by reference characters *p, q, s, u, v*. In order to save annular cores and indicators in the translation register NK, combinations of annular cores are used, for example a combination of 2 out of 5 code if the analyzer is built in the form of decades.

Here it is presupposed that each signal wire L1–LM corresponds to a line and that each test wire corresponds to a directory number in an automatic telephone exchange. The lines often change numbers and the number of a line is determined by means of a connecting wire in the intermediate distribution frame MK, for example between the signal wire L4 and the test wire T1. Upon a call identification in the telephone exchange, data are recorded for the multiple position of the calling line in a register. If the directory number corresponding to the multiple position is required, for example for call charging, the register will be connected to the control device M and data for the multiple position are transmitted by means of signals to device M which sets the selector device V on a signal wire corresponding to the multiple position of the calling line, for example L4. Then a signal is sent from device M to the pulse generator PG so that the relay R1 is operated in a circuit through the wire *k*1 and the contact 22. The contacts 11–13 are operated and a circuit is completed from voltage source +, the capacitor C1, the rectifier *h*1, the wire *i*1, the selector device V, the signal wire L4, the frame MK, the test wire T1, the annular core *e*1, the bundle of wires G1, the annular core *g*1, the bundle of wires D1, the annular cores *a* and *b*, the wire E1, the annular cores *p* and *q*, the resistor *r*2 to negative source. During the charging time of the capacitor C1 a pulse is fed through said circuit. This pulse is transformed by the annular cores to reading wires *te*, *t*1, *ta*, *tb*, *tp* and *tq*. The pulse transformed are recorded in recording elements OK and NK respectively. The recording is transmitted to the control device M by a bundle of wires Z, is translated into a decade number and is sent to the register that has demanded the information as to the directory number. Then units M, V and PG will be released.

The recording elements of the registering means AK can be electronic bistable circuits combined with amplifiers which is presupposed in recording element OK, only small annular cores *e*1–*e*N being required, or of electromagnetic relays combined with transistors as is presupposed in translation register NK. The annular cores *g*–*gn* and *a*–*f* are to enclose a great number of test wires and therefore they become large.

If the annular cores are made of soft iron only one pulse is necessary viz. that one which is obtained when the capacitor C1 is charged. When pulse generator PG is released, the relay R1 is released and capacitor C1 will be discharged by the rectifier *h*2 and the resistor *r*1 in a circuit through the contacts 24 and 13. When the annular cores *e*1–*e*N obtain only limited information, for example for indicating a restriction for a line with a certain number, the test wire of the number is passed through its annular core while in other cases it is passed beside the annular core.

If the annular cores are made of ferrite or another magnetic material with an essentially rectangular hysteresis loop, a writing pulse and an erasing pulse will be necessary for each reading. From all operated recording elements for some group of reading wires, for example wires *t*1–*tn*, or from the recording element OK a signal will be sent, after a reading, from a positive source through the wire *z*1 and the contact 31 to the winding of the relay R2 which then operates. The contacts 21–24 are operated. The rectifier *h*1 is short-circuited and the current of the relay R1 is interrupted. The relay R1 releases its armature but the relay R2 is held by means of current through the contact 21 and the capacitor C1 is discharged in a circuit through the resistor *r*1, the contacts 13 and 23 and the signal wire L4 and the test wire T1. The same annular cores are pulsed as when the capacitor C1 was charged. The field direction in the annular cores is switched when capacitor C1 is charged but is restored when capacitor C1 is discharged.

It is however desirable to give the translator a wider application in that the translator is given a mechanical construction in which the test wires do not need to be changed. The annular cores *e*1–*e*N are therefore made of ferrite material and each test wire T1–T*n* is passed through such a ferrite ring that is individual for the test wires.

The ferrite rings *e*1–*e*N are provided to allow writing, reading and nullification of a more or less temporary recorded condition for a subscriber's line, for example transfer service, interception or supervision. Writing and nullification are carried out with the help of a call to the directory number of the line preceded by a prefix. At the writing the directory number is preceded by a first prefix and at the nullification by a second prefix. Reading takes place at each call to the directory number of a line. The register that connects itself to the control device M in the figure is thus set in conformity to the directory number of a called line and the translator is used to determine the multiple position and an eventually recorded certain condition of the called line.

Each of the signal wires L1–LM corresponds to its separate directory number and each of the test wires corresponds to its separate multiple position. The exchange is presupposed to be equipped with primary and secondary crossbar switches, the size of a subscriber's group being determined by the multiple capacity of the operating bars of the crossbar switches. Each annular core *g*–*gn* corresponds to a subscriber's group and each subgroup G1–GF corresponds to a group of A-selectors having the multiple capacity *m*.

The reading wires *t*1–*tn* indicate the subscriber's group. The reading wires *ta*–*tf* indicate the A-selector group within the subscriber's group and the reading wires *tp*–*tv* indicate a line within the A-selector group. The lines within the subscriber's group are arbitrarily numbered and the line location numbers are determined by connections in the intermediate distribution frame MK.

The annular cores *g*1–*gn*, *a*, *b*, *c*, *d*, *f* and *p*, *q*, *s*, *u*, *v* are made of soft iron. Each analyzing or reading is initiated by the operation of the relay R1 in the pulse generator PG. The contacts 11–13 are operated and the capacitor C1 is charged in the above described circuit through the rectifier *h*1, the wire *i*1, the selector V, a signal wire corresponding to the number that is to be translated, frame MK, and the test wire corresponding to the signal wire, resistor *r*2, to source negative. The pulse is transformed to one of the reading wires *t*1–*tn*, a combination of the reading wires *ta*–*tf* and a combination of the reading wires *tp*–*tv*. Depending on the magnetization condition of the ferrite core *e*1–*e*N in question the charging pulse is transformed or is not transformed to the reading wire *te*. In order to get a positive signal when a line is switched to a special condition, for example for interception, in which case all calls to the line have to be connected to a manual table, the ferrite cores *e*1–*e*N are from the beginning magnetized in such a direction that no signal is obtained on the reading wire *te* when the capacitor C1 is charged. Switching to interception is written in the translator by a call to the directory number in question, preceded by a directive digit. The directive digit as well as the directory number are transmitted to the control device M which causes setting of the selector V and also operation of the relay R1 and furthermore that a circuit for operation of the relay R2 in the pulse generator is closed when the relay R1 has operated. This circuit is completed through the wire *k*2 and the contact 11. The contacts 21–24 are operated and the discharging pulse of the capacitor C1 as well as its charging pulse are conducted through the wire *i*1 and the selector V to the analyzer. The ferrite ring corresponding to the called directory number, for example *e*1, is remagnetized by the discharging pulse. Then each call to the directory number corresponding to the signal wire L4 will bring about a pulse through the reading wire *te* to the indicator OK when the capacitor C1 is charged. The indicator OK is operated and gives a signal through a wire in the bundle of wires *z* to the control device M that forwards the signal to the connected register and furthermore a signal through the wire *z*1, the contact 31 and the windings of the relay R2. The relay R2 operates and causes a rewriting of the marking condition in the ferrite ring e1. This is carried out after each analyzing of the directory number and therefore the writing is preserved.

When a writing is to be nullified the directory number, preceded by a directive digit that is characteristic for nullification, is called. This directive digit is transmitted simultaneously with the directory number to the control device M. This implies that the relay R3 in the pulse generator PG is operated immediately before or simultaneously with the relay R1 in a circuit through the wire *k*3. The contact 31 is operated, so that the relay R2 is prevented from operating. The rewriting is inhibited and the ferrite core *e*1 is again maintained in the operated condition in such a direction that the charging pulse of the capacitor C1 does not apply any signal to the indicator OK upon the analyzing of the data of the directory number corresponding to the signal wire L4.

The invention can of course be varied in many ways without departing from the scope of the invention. Thus each line can be provided with several signal wires L1–LM which are connected simultaneously by the selector device V if this is made multi-polar and several pulse generators and analyzer arrangements are provided. Accordingly several condition markings which are independent of each toher can be obtained and the annular cores *e*1–*e*N can be separated from the annular cores *g*1–*gn* and the annular cores in D and E, so that ferrite rings can be used throughout the whole analyzer.

In large main groups two or more annular cores *g*1–*gn* per main group are necessary and each reading wire *t*1–*tn* is passed through all annular cores belonging to a main group.

It is furthermore not necessary to use only one group row D with annular cores and special annular cores *g*1–*gn* for each main group. The number of test wires in a main group can be increased beyond the number provided in an annular core if a group row D is arranged for each main group and the reading wires *t*1–*tn* are passed through all annular cores in the respective group row. The reading wires *ta*–*tf* are each passed through its own annular core in each group row D, so that a common group of indicators is obtained in the recording device NK for all group rows D.

We claim:

1. In an automatic telephone exchange which includes registers responsive to numbers identifying subscribers' lines, for controlling connections between said lines via line-equipment for each of said lines, the combination comprising, an intermediate distribution frame having first and second sets of connecting points, each of the points of one of said sets of points being assigned a number representing the directory number of a subscriber's line, each of the points of the other of said sets of points being assigned a number representing at least the location of the line equipment of a subscriber's line, a plurality of jumper lines, each of said jumper lines connecting the point in the first set to the point in the second set associated with the same subscriber's line, a line selector having one input and a plurality of outputs whereby said one input is connected to a particular output in accordance with received control signals, a controllably actuatable pulse generator connected to the input of said line selector, a plurality of input lines, each of said input lines connecting one output of said line selector to one connecting point of said first set respectively, a plurality of test lines, each of said test lines being connected to one connecting point of said second set respectively, a translator comprising a plurality of magnetic cores and reading windings coupled to said cores, each of said test wires being electromagentically coupled to different combinations of said cores representing line location numbers, registering means for recording and transmitting signals received from said reading windings, control means connectable to said registers and receiving a directory number therefrom for generating a control signal to cause said line selector to select an output in accordance with said received number and for causing said pulse generator to emit a pulse whereby said pulse is transmitted to one of said test lines via said distribution frame so that said registering means receives a combination of signals representative of a line location number, and means for connecting said registering means to said control means so that said line location number is transmittable via said control means to one of said registers.

2. The combination of claim 1 wherein said line location numbers are assigned according to a given numbering system, said magnetic cores being divided into first and second pluralities, said test wires being divided into first groups wherein each of the test wires of each first group is numerically related to a test wire in each other first group, each of said first group of test wires being coupled to a different core of said first plurality of cores, and said related test wires being interconnected and coupled to a different core of said second plurality of cores.

References Cited

UNITED STATES PATENTS

| | | |
|---|---|---|
| 3,231,680 | 1/1966 | Yamato et al. |
| 3,032,747 | 5/1962 | French. |
| 2,843,838 | 7/1958 | Abbott. |

KATHLEEN H. CLAFFY, Primary Examiner

T. W. BROWN, Assistant Examiner